UNITED STATES PATENT OFFICE.

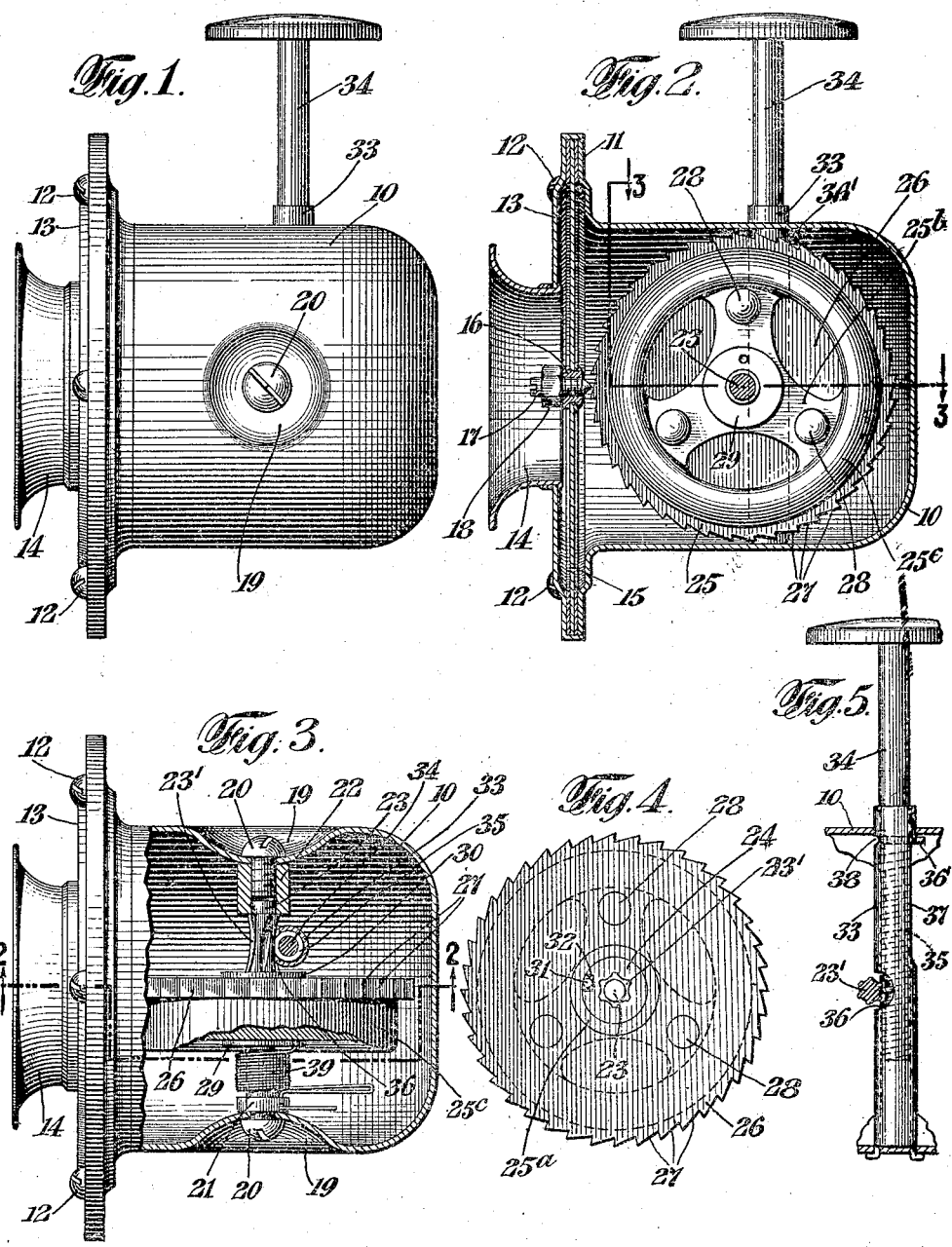

EDMUND HUGH PRYCE, OF NEW YORK, N. Y.

SIGNAL APPARATUS.

1,274,779.  Specification of Letters Patent.  Patented Aug. 6, 1918.

Application filed February 2, 1917. Serial No. 146,057.

*To all whom it may concern:*

Be it known that I, EDMUND H. PRYCE, a subject of the King of Great Britain, residing at the city of New York, borough of Manhattan, in the county and State of New York, have invented certain new and useful Improvements in Signal Apparatus, of which the following is a complete specification.

This invention relates to improvements in signal apparatus, and has for its object to provide an apparatus which is simple in construction and operation and by means of which a continuous audible signal can be produced.

Further, said invention has for its object to provide a signal apparatus the parts of which may be readily and easily assembled.

Further, said invention has for its object to provide a signal apparatus which is compact in form, simple in operation, and neat in appearance.

Further, said invention has for its object to provide a hand-operated signal apparatus which is positive in operation, capable of being inexpensively made, and which consists of the minimum number of parts so constructed and arranged as to be readily assembled.

Other objects will in part be obvious and in part be pointed out hereinafter.

To the attainment of the aforesaid objects and ends, my invention consists in the novel details of construction, and in the combination, connection and arrangement of parts hereinafter more fully described and then pointed out in the claims.

In the accompanying drawing showing an illustrative embodiment of the invention—

Figure 1 is a side elevational view of a signal apparatus constructed according to and embodying the invention;

Fig. 2 is a sectional view taken on the line 2—2 of Fig. 3;

Fig. 3 is a sectional view taken on the line 3—3 of Fig. 2;

Fig. 4 is a detail view of a portion of the operating mechanism with the clutch mechanism forming part thereof, and Fig. 5 is a detail side elevational view of the sleeve and the reciprocatable member working therein.

Referring to the drawing 10 indicates a shell the front end of which is open and provided with an outwardly extending flange 11. Secured to the flange 11 by bolts 12, or other suitable fastening means, is an annular plate 13 having a forwardly extending mouth piece 14. The shell 10 and annular plate 13 constitute a casing within which the operating parts of the horn are supported. Clamped between the plate 13 and the flange 11 of the shell 10 is a diaphragm 15, preferably formed of sheet metal, provided at its center with a threading bushing 16 having adjustably mounted therein a wear member 17, which, as shown, consists of a threaded pin having a pointed or beveled inner end. The wear member 17 is held in its adjusted position by means of a locknut 18 threaded upon its outer end.

Positioned within the shell 10, and secured to the oppositely disposed depressed portions 19 of the wall thereof by screws 20, are bearing 21, 22, within which are journaled the ends of a shaft 23 provided with a pinion 23'. Secured to the shaft 23 is a sleeve 24 having loosely mounted thereon a diaphragm actuator comprising a fly wheel 25, and a disk 26 provided with peripheral teeth 27 adapted to engage the inner end of said wear member 17. The fly wheel comprises a hub 25$^a$ from which extend spokes 25$^b$ having their outer ends connected to the rim 25$^c$. By means of this construction the greater part of the metal, of which the fly wheel 25 is composed, is contained within the rim 25$^c$, thereby insuring a maximum storing of energy for a given amount of metal. The disk 26 is mounted upon the hub 25$^a$ of the fly wheel 25 and is secured to the spokes 25$^b$ thereof by rivets or the like 28.

Lateral movement of the actuating member 25, 26 relative to the shaft 23 is prevented by means of a collar 29 upon the sleeve 24, and a washer 30 snugly engaging the shaft 23.

A friction clutch, comprising a spring pressed roller 31 positioned within a recess 32 formed in the surface of the sleeve 24, insures the rotation of the diaphragm actuator 25, 26 when the shaft 23 is rotated in one direction only, and permits the shaft 23 to rotate in the opposite direction without rotating the diaphragm actuator 25, 26.

Extending through the shell 10 is a sleeve 33 having its lower end secured to the bottom wall of the shell 10 and its upper end extending through the top wall thereof. Reciprocatingly mounted within the sleeve 33 is a headed plunger 34 provided with a thread 35 constituting a rack and engaging with the pinion 23' through an opening 36 formed in the front wall of the sleeve 33. The plunger 34 is prevented from rotating within the sleeve 33, and the upward movement of the plunger is limited, by means of a pin 36' carried by the plunger 34 and having a projecting end engaging a vertical slot 37 formed in the rear wall of the sleeve 33. A hole 38, formed in the front wall of the sleeve 33, permits the pin 36' to be placed in position or removed therefrom. The plunger 34 is normally held in its raised position, and is returned to its normal position after being depressed, by means of a coiled spring 39 having one end secured to the bearing 21 and its other end secured to the sleeve 24 fixed upon the shaft 23.

In assembling the parts of the device, after the bearings 21, 22, and the shaft 23 and the parts carried thereby are properly positioned, the plunger 34 is inserted within the sleeve 33 with the lower end of the thread 35 engaging the pinion 23' on the shaft 23. The plunger 34 is then rotated within the sleeve 33 without permitting it to move downwardly with respect to the sleeve 33. This rotary movement of the plunger 34 will cause the shaft 23 to be rotated in a direction to cause the spring 39 to be wound up and placed under tension. When the spring 39 has been wound sufficiently to produce the desired tension, the hole in the plunger 34, which receives the pin 36', is brought into register with the hole 38 in the front wall of the sleeve 33 and the pin 36' is screwed into position within the plunger 34 with its free end projecting through the slot 37 in the rear wall of the sleeve 33.

To operate the horn the plunger 34 is pressed downwardly by the hand of the operator whereupon the threaded portion 35, which engages the pinion 23', will cause the shaft 23 and sleeve 24 to rotate; and as the roller clutch 31 is operative while the shaft 23 is rotating in this direction the diaphragm actuator 25, 26 will also be rotated. As the diaphragm actuator 25, 26 is rotated the teeth 27 of the disk 26 will successively engage the inner end of the wear member 17 on the diaphragm 15 and cause said diaphragm 15 to vibrate and produce an audible signal. Upon removing the hand from the plunger 34 when it has reached its lowermost position, the spring 38 will cause the shaft 23 and sleeve 24 to rotate in the opposite or reverse direction thereby raising the plunger 34 to its normal position. As the roller clutch is inoperative during this reverse rotating movement of the shaft 23 and sleeve 24, the diaphragm actuator 25, 26 is free to rotate upon the sleeve 24, and, by reason of the momentum of the fly wheel 25, it will continue to rotate during the time that the plunger 34 is being returned to its normally raised position by the action of the spring 39, and the operation, as above described, repeated. It will thus be understood that, by quickly and successively depressing the plunger 34 and allowing it to return to its normal position a number of times, a continuous signal can be produced.

Having thus described my said invention, what I claim and desire to secure by Letters Patent is:—

1. A signal apparatus embodying a sound-producing element, rotatable actuating means therefor, a reciprocating member in operative engagement with said rotatable actuating means and revoluble with respect thereto, means for maintaining said reciprocating member normally projected and under tension, and means for holding said reciprocating member against rotation and to its adjusted tension, substantially as specified.

2. A signal apparatus embodying a sound-producing element, rotatable actuating means therefor, a reciprocating member in operative engagement with said rotatable actuating means and revoluble with respect thereto, spring means for maintaining said reciprocating member normally projected and under tension, and means for holding said reciprocating member against rotation and to its adjusted tension, substantially as specified.

3. A signal apparatus embodying a sound-producing element, rotatable actuating means therefor including a ratchet mechanism, a reciprocatable rack member in operative engagement with said rotatable actuating means and revoluble with respect thereto, spring means for maintaining said rack member normally projected and under tension, and means for holding said reciprocatable rack member projected against rotation and said spring means to its adjusted tension, substantially as specified.

4. A signal apparatus embodying a sound-producing element, rotatable actuating means therefor including a ratchet mechanism, a reciprocatable rack member revoluble with respect to said rotatable actuating means, and having its teeth formed as a spiral and operatively engaging the ratchet mechanism of said rotatable actuating means, spring means for maintaining said rack member normally projected and under tension, and a stop for holding said rack member normally projected, and serving to maintain said spring means to its adjusted tension, substantially as specified.

5. In a signal apparatus, the combination of a casing, a sound producing element carried thereby, a member for actuating said sound producing element, means operatively connected to said member to operate the same, and a normally tensioned spring to restore said means to its normal position after it has been operated, said means serving to place said spring under its normal tension, substantially as specified.

6. In a signal apparatus, the combination of a casing, a sound producing element carried thereby, a member for actuating said sound producing element, a reciprocatable member operatively connected to said first mentioned member to operate the same, and a normally tensioned spring to restore said reciprocatable member to its normal position, said reciprocatable member serving to place said spring under its normal tension, substantially as specified.

7. In a signal apparatus, the combination of a casing, a sound producing element carried thereby, a member for actuating said sound producing element, a reciprocatable member operatively connected to said first mentioned member to operate the same, a spring to restore said reciprocatable member to its normal position after it has been depressed, said reciprocatable member being adapted to be moved in other than a reciprocatory manner to tension said spring, and means for holding said reciprocatable member against movement other than a reciprocating movement after said spring has been tensioned, substantially as specified.

8. In a signal apparatus, the combination of a casing, a sound producing element carried thereby, mechanism supported within said casing for actuating said sound producing element and comprising a pinion, a reciprocatable element provided with a thread engaging said pinion to rotate it in one direction, a spring for rotating said pinion in the opposite direction, said reciprocatable member being adapted to be rotated with its threaded portion engaging said pinion to rotate the same to tension said spring, and means for holding said reciprocatable member against rotation after said spring has been tensioned, substantially as specified.

9. In a signal apparatus, the combination of a casing, a sound-producing element carried thereby, a shaft rotatably supported within said casing, a revoluble member mounted upon said shaft for actuating said sound-producing element, means operatively connecting said revoluble member to said shaft during the rotation of said shaft in one direction only, means for rotating said shaft in said one direction, and a normally tensioned spring for rotating said shaft in the opposite direction and restoring said shaft rotating means to its normal position after it has been actuated, said shaft operating means serving to place said spring under its normal tension, substantially as specified.

10. In a signal apparatus, the combination of a casing, a sound-producing element carried thereby, a shaft rotatably supported within said casing, a revoluble member mounted upon said shaft for actuating said sound-producing element, means operatively connecting said revoluble member to said shaft during the rotation of said shaft in one direction only, reciprocatable means for rotating said shaft in said one direction, and a normally tensioned spring for rotating said shaft in the opposite direction and restoring said shaft rotating means to its normal position after it has been actuated, said shaft operating means serving to place said spring under its normal tension, substantially as specified.

11. In a signal apparatus, the combination of a casing, a sound-producing element carried thereby, a shaft rotatably supported within said casing and provided with a pinion, a revoluble member mounted upon said shaft for actuating said sound-producing element, means operatively connecting said revoluble member to said shaft during the rotation of said shaft in one direction only, a reciprocatable member provided with a thread engaging said pinion to rotate said shaft in said one direction, a spring for rotating said shaft in the opposite direction, said reciprocatable member being adapted to be rotated with its threaded portion engaging said pinion whereby the shaft will be rotated to tension said spring, and means for holding said reciprocatable member against rotation after said spring has been tensioned, substantially as specified.

12. In a signal apparatus, the combination of a casing, a sound-producing element carried thereby, a shaft rotatably supported within said casing and provided with a pinion, a revoluble member mounted upon said shaft for actuating said sound-producing element, means operatively connecting said revoluble member to said shaft during the rotation of said shaft in one direction only, a reciprocatable member provided with a thread engaging said pinion to rotate said shaft in said one direction, a spring for rotating said shaft in the opposite direction, said reciprocatable member being adapted to be rotated with its threaded portion engaging said pinion whereby the shaft will be rotated to tension said spring, and removable means for holding said reciprocatable member against rotation after said spring has been tensioned, substantially as specified.

Signed at the city of New York, in the county and State of New York, this 24th day of January, one thousand nine hundred and seventeen.

EDMUND HUGH PRYCE.

Witnesses:
CONRAD A. DIETERICH,
LOUIS B. HASBROUGH.